Patented Aug. 30, 1927.

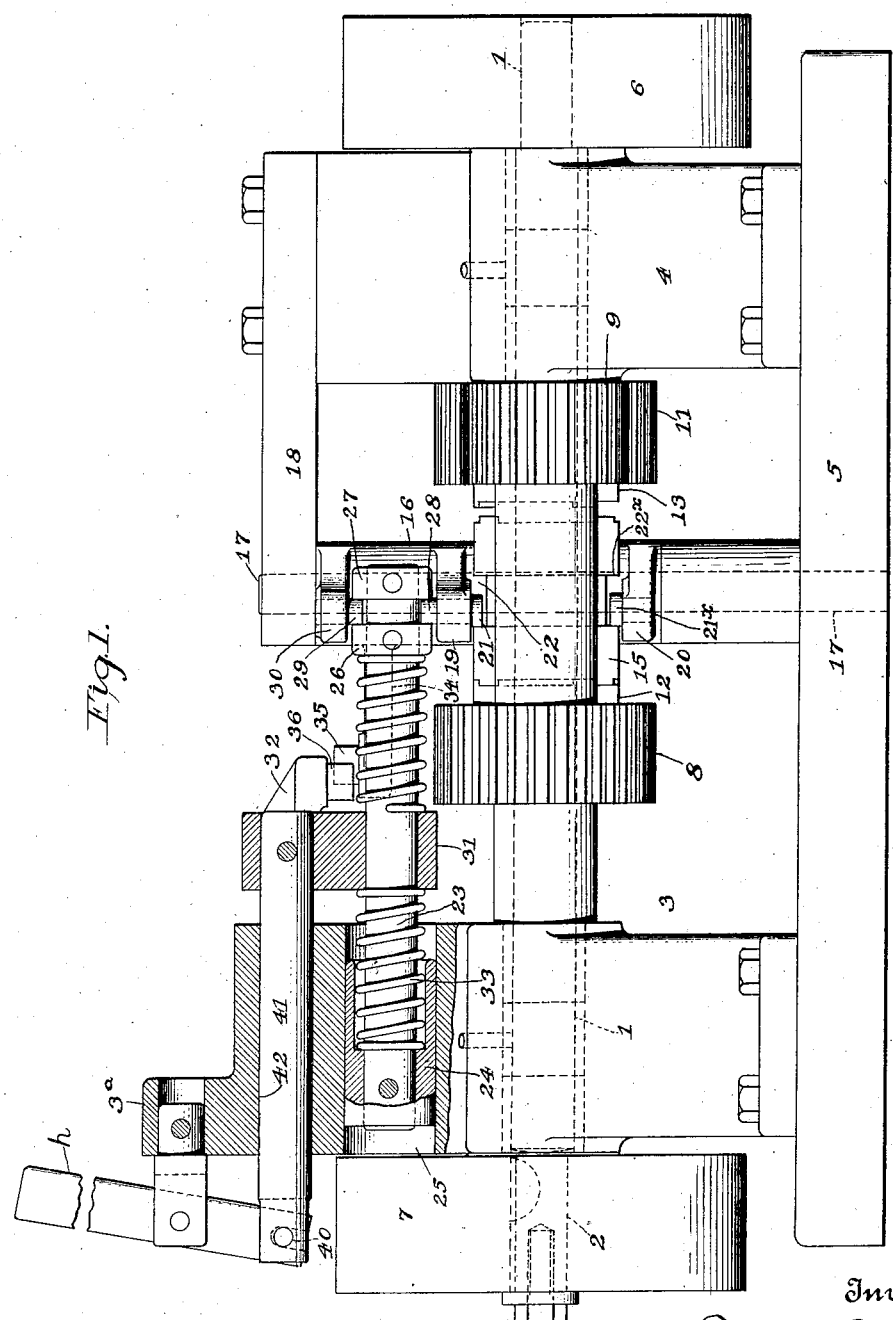

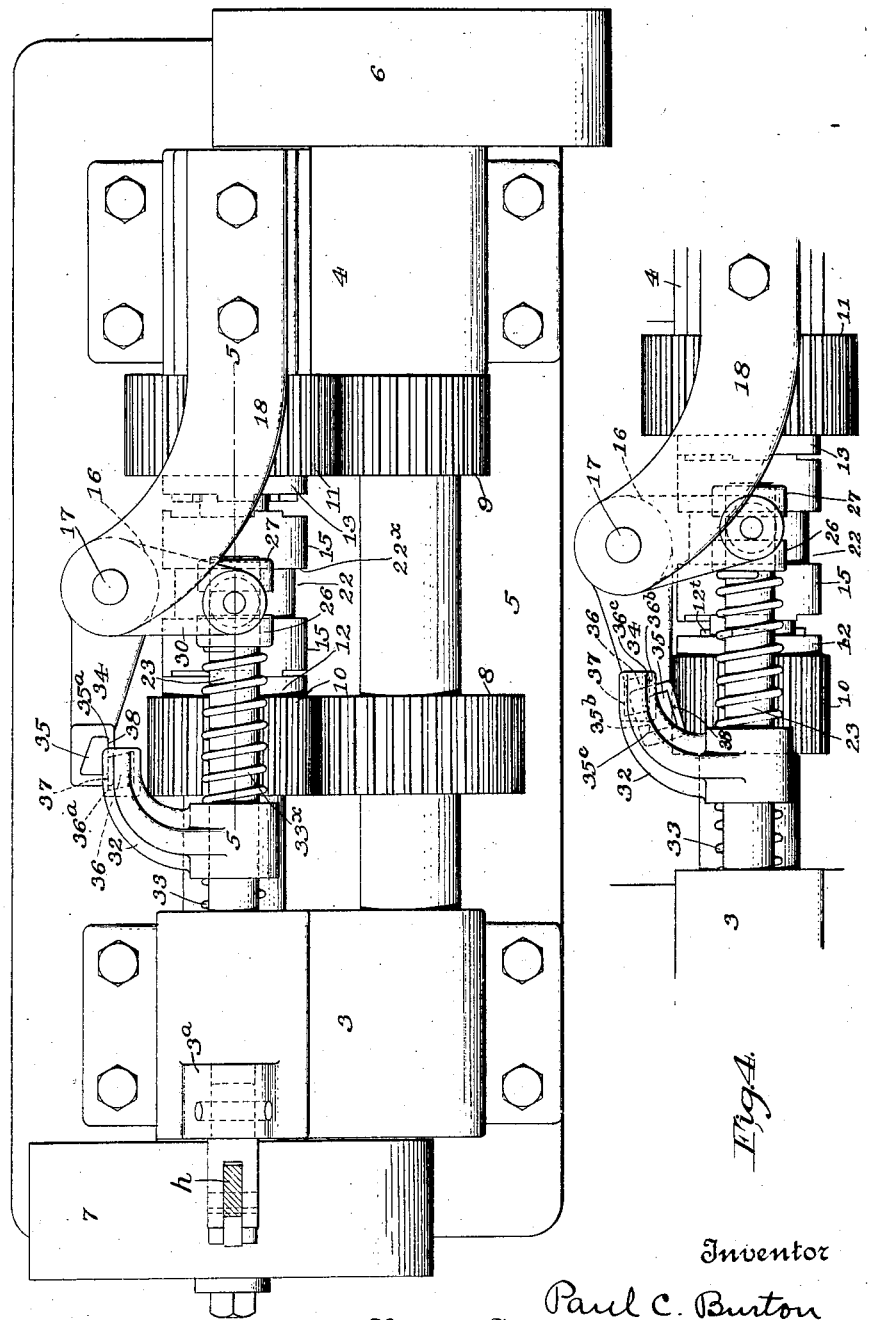

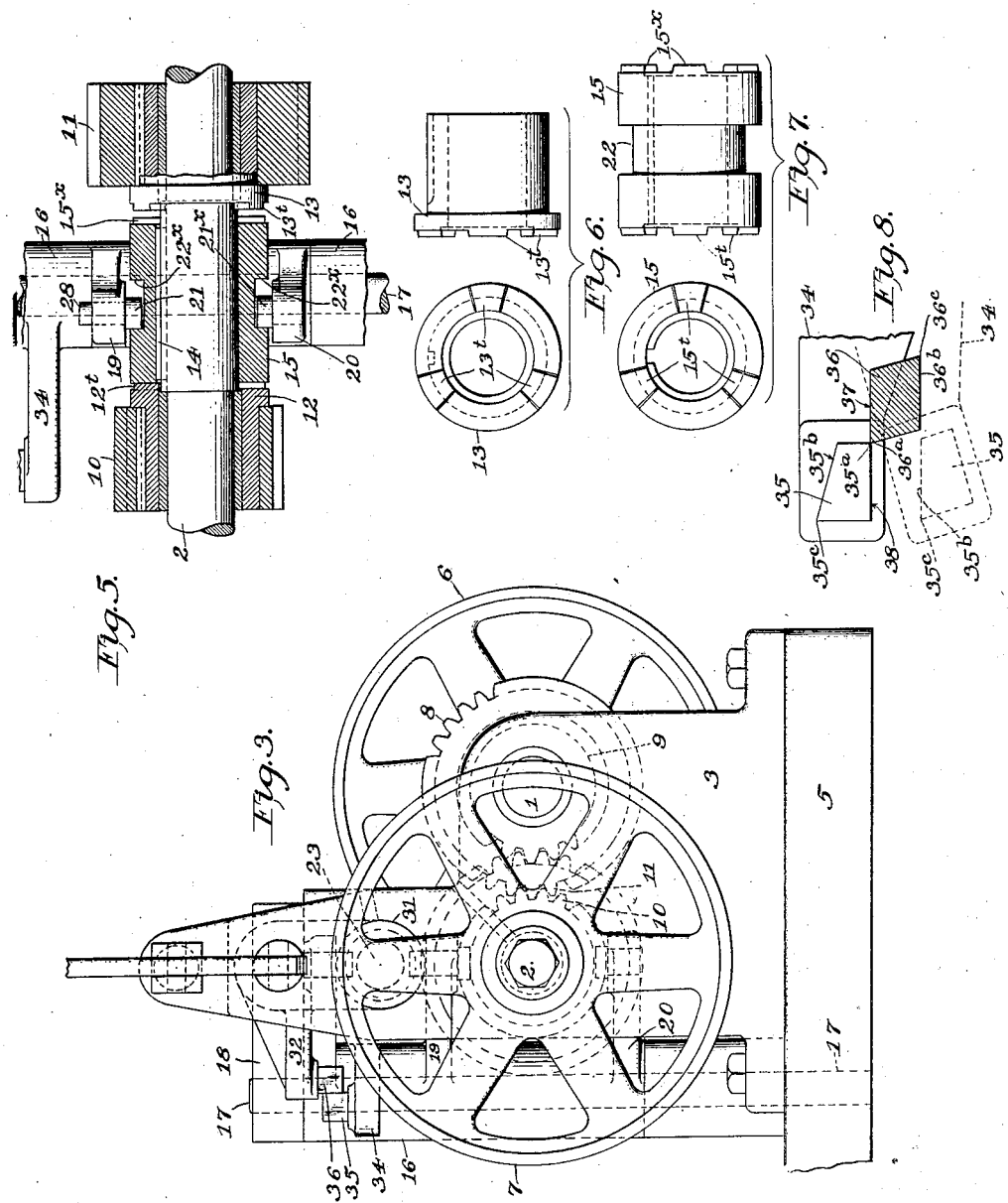

1,640,530

UNITED STATES PATENT OFFICE.

PAUL C. BURTON, OF LA GRANGE, ILLINOIS, ASSIGNOR TO THE NATIONAL AUTOMATIC TOOL COMPANY, OF RICHMOND, INDIANA, A CORPORATION OF INDIANA.

SPRING-OPERATED CLUTCH-SHIFTING MECHANISM.

Application filed June 20, 1924. Serial No. 721,226.

This invention relates to a shifting device for driving mechanisms of that type in which one of the driving members is adapted to be translated into either of two positions by power stored up in a compressed spring, said power at the proper time, being released through the action of a suitable trip. The invention is equally adaptable to the shifting of a clutch-member, the translation of gears, or the actuation of various other machine elements, and while it is shown and described particularly in connection with a tooth clutch it is to be understood that this is merely one typical embodiment of the invention and that the invention also contemplates various other uses. The term "clutch" therefore is to be given a broad interpretation wherever used in this specification.

These devices are particularly useful in machine tool organizations which involve speed-changes, reversals in movement or other power connections which have to provide a yielding throw of the clutch (or other element) as a result of a positive unyielding movement of some other member. Many of these so-called "load-and-fire" devices have heretofore been provided, all of which are more or less complicated in construction and unsatisfactory in action.

This invention has for an object to provide a shifting mechanism of the "load-and-fire" type which is exceedingly rugged and simple in construction, being devoid of the multiplicity of latches, triggers, etc., of prior devices.

A further object is to provide a clutch shifting mechanism which will operate with equal facility under varying torsional strains.

A still further object of the invention is so to construct a clutch-shifting device of this nature that a single element may be employed for locking the clutch-shifter in its various positions, which element also forms a trip for releasing the clutch-shifter to permit it to be moved under the action of power previously stored in a suitable spring.

These and other objects are attained in a clutch-shifting mechanism in which the clutch (or other) element is moved by means of a pivoted lever adapted to be placed under spring pressure in either of two directions, said lever having a portion movable in a path intersecting the path of movement of a suitable clutch-shifter retaining element. This retaining element is preferably constructed and arranged to return to a predetermined position after each clutch-shifting operation and in this position to alternately engage opposite faces on the clutch-shifting lever to hold the latter in its different positions.

Inasmuch as these devices are frequently required to operate under a substantial load which tends to restrain the elements of the clutch against being readily shifted, this invention proposes a construction in which the clutch-shifting lever is constructed and arranged to deliver a blow to the shiftable clutch-member whereby the then-driving clutch-teeth are quickly and forcibly disconnected and the teeth on the opposite side of the shiftable clutch-member are forced into engagement with the teeth of another clutch-member. This construction eliminates the possibility of the clutch becoming stuck when transmitting heavy torsional loads.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a side elevation, partly in section, of a speed-changing device embodying the present invention. Fig. 2 is a plan of Fig. 1. Fig. 3 is a left end view thereof. Fig. 4 is a detail plan of the clutch-shifting mechanism showing it in a different position of adjustment from that shown in Fig. 1. Fig. 5 is a detail section substantially on the line 5—5 of Fig. 2, certain parts being omitted. Fig. 6 is end and side views of one of the non-shiftable clutch-members, and Fig. 7 is similar views of the translatable clutch-element. Fig. 8 is an enlarged detail of the clutch-shifter locking mechanism.

For the purpose of illustration, this invention is disclosed as embodied in a conventional speed-changing mechanism comprising a driving shaft and a driven shaft with two pairs of gears of different ratio therebetween. Either of the shafts may be the driving shaft but for convenience of description the shaft 1 may be considered as the driving shaft and 2 may designate the driven shaft. These shafts are disclosed as journaled in standards 3 and 4 carried by a suitable base 5. The shaft 1 may have secured upon it a driving pulley 6 and the shaft 2 may carry a pulley 7 adapted to transmit power to any suitable mechanism.

The invention is disclosed in the form of a clutch-shifting device but it is to be understood that the invention is equally adaptable to various forms of gear shifting devices reversing mechanisms, etc.

To drive the shaft 2 at varying speeds, large and small gears 8 and 9 respectively are fixed upon the shaft 1 and mesh with correspondingly small and large gears 10 and 11 loosely journaled coaxial with the shaft 2. Either of the gear-sets 8—10 or 9—11 may be rendered effective to drive the shaft 2 by means of a clutch-mechanism now to be described.

The gears 10 and 11 are preferably carried by clutch-members 12 and 13 respectively, provided with clutch-teeth 12$^t$ and 13$^t$. These clutch-members are freely rotatable coaxially with the shaft 2 but are held against endwise movement thereon. Splined at 14 to the shaft 2, intermediate the clutch-members 12 and 13, is a translatable clutch-member 15 having at its opposite ends clutch-teeth 15$^t$ and 15$^x$ adapted selectively to be engaged with the teth 12$^t$ and 13$^t$ of the members 12 and 13.

A clutch-shifting element 16 is loosely journaled on a shaft 17 held at one end in the base 5 and at its other end in a bracket 18 carried by the standard 4. The element 16 provides arms 19 and 20 (constituting a clutch-shifting fork) which carry pins (or rollers) 21 and 21$^x$ having their inner ends located within an annular groove 22 formed in the translatable clutch-member 15. It is to be noted that the groove 22 is substantially wider than the pins 21 and 21$^x$. The purpose of this will be explained later.

As hereinbefore stated the clutch-shifting mechanism is adapted to be actuated by power stored up in a suitable spring. To this end a shaft 23 is arranged parallel with the shaft 2 and has secured to it at one end, a thimble 24 slidingly fitted within a bore 25 in the standard 3. The opposite end of the shaft 23 carries spaced collars 26 and 27 between which are fitted the projecting ends of pins 28 and 29 carried by arms 19 and 30 provided by the element 16. If desired the pin 28 may be formed as a part of the pin 21 or it may be separate therefrom. Slidingly mounted upon the shaft 23 intermediate the sleeve 24 and the collar 26 is the hub 31 of an arm 32. A coil-spring 33 surrounds the shaft 23 between the sleeve 24 and hub 31 and a similar spring 33$^x$ is located between the hub 31 and the collar 26. These two springs being of equal strength normally act to hold the hub in a predetermined position midway between the sleeve and collar but permit it to be moved in either direction lengthwise of the shaft 23.

As previously described the clutch-shifter is adapted to be moved by means of power previously stored up in a suitable spring; which power is suddenly released by a trip mechanism. Referring now particularly to Figs. 1 and 2 in which the clutch-members 12 and 15 are connected, thereby driving the shaft 2 from the shaft 1 through the gears 8 and 10, it will be seen that the clutch-members are held against separation by means of a locking arm 34 also provided by the member 16. This arm is formed with an abutment or stop-block 35 adapted to contact with an abutment 36 provided by the arm 32. The arms 19 and 20 and the arm 34, projecting substantially at right angles from the member 16, act as a bell-crank lever and prevent the clutch-member from shifting to the right (as viewed in Fig. 2) when the blocks 35 and 36 are engaged as shown in Fig. 2. They also act to positively hold the clutch-members 13 and 15 in engagement when the parts are in the position shown in Fig. 4, which position will be explained more fully later.

With the parts in the positions shown in Fig. 2, suppose it is desired to drive the shaft 2 at a slower speed, two things are necessary; first, the clutch-shifter 16 must be released by the abutment 36 and second, the clutch-member 15 must be shifted to release the clutch-member 12 and engage the clutch-teeth 15$^x$ and 13$^t$ of the clutch-members 15 and 13 respectively. With this effected, power will flow from the shaft 1 through gears 9 and 11 and drive the shaft 2 at a slower speed. This is preferably effected by sliding the hub 31 along the shaft 23 to the right (as viewed in Figs. 1 and 2) against the resistance of the spring 33$^x$. In this movement of the hub 31 and its attached arm 32 the surface 37 of the abutment 36 passes over the face 38 of the block 35 until the corner 36$^a$ reaches the corner 35$^a$ as shown in Fig. 8. During this movement the hub 31 has compressed the spring 33$^x$ (one end having been seated against the then-stationary collar 26) and has stored power therein. After the parts have reached the position shown in Fig. 8, a further movement of the hub 31 and arm 32 causes disconnection of the abutments 35 and 36, whereupon the member 16 is free to be oscillated about the shaft 17 under the action of the spring 33$^x$ which then moves the shaft 23 and the collars 26 and 27 thereon to the right.

To insure the disconnection of the clutch-teeth $12^t$ and $13^t$ even when the clutch is transmitting a heavy load, the clutch-shifting pins are made of substantially less width than the annular groove 22 in the shiftable clutch-member. This permits the arms 19 and 20 and the pins carried thereby to accumulate considerable momentum under the action of the spring $33^x$ before the pins contact with the wall $22^x$ of the groove 22. By this arrangement the pins 21, $21^x$ are caused to strike a considerable blow against the wall $22^x$ which quickly and forcibly disconnects the teeth $12^t$ and $15^t$. After the pins have engaged the wall $22^x$ a further movement of the clutch-shifter 16 into the position shown in Fig. 4 and the dotted line position in Fig. 8, causes translation of the member 15 and engages its teeth $15^x$ with the teeth $13^t$ of the clutch-member 13 fast to the gear 11, thus effecting a slow-speed drive through the gears 9 and 11.

The lengths and relative positions of the abutments are such that the distance through which the abutment 36 is required to move in order to pass the abutment 35 is greater than the distance through which the clutch-collars 26 and 27 are required to move in the same direction to move the clutch-shifter from one extreme position to the other, including the lost motion between the pins 21 and $21^x$ and the annular groove 22. Therefore, after the clutch-member has been shifted from the position shown in Figs. 1 and 2 to the position shown in Fig. 4 the spring $33^x$ is still compressed to some extent. When the hub 31 is released from its shifting means the power stored in the spring $33^x$ acts to retract the hub 31 and the arm 32 to the position shown in Fig. 4 in which the face $36^b$ of the abutment 36 contacts with the face $35^b$ of the block 35 thus holding the clutch-shifter in its new position. In this position of the hub 31 and arm 32 the pressure of the springs 33 and $33^x$ is equalized and the entire clutch shifting mechanism is held strain-free.

Any suitable means either manual or automatic may be provided for shifting the member 31—32 in opposite directions lengthwise of the shaft 23 from its normal position. One means for effecting this movement may conveniently comprise a hand-lever $h$ pivoted intermediate its ends to an extension $3^a$ of the standard 3. This lever has at one end, a pin-and-slot connection 40 with a slide-rod 41, translatably mounted in a bore 42 in the standard 3, upon which is secured the hub 31. Thus the member 31—32 may be alternately shifted in opposite directions by the hand-lever $h$ in opposition to the springs 33 and $33^x$.

To return the mechanism to the position shown in Figs. 1 and 2 the operator shifts the hand-lever $h$ to the right (as seen in Fig. 2) which causes the member 31—32 to be moved to the left against the action of the spring 33, the face $36^b$ of the block 36 sliding on the face $35^b$ of the abutment 35 until the corner $36^c$ clears the corner $35^c$ (see Fig. 4 and dotted line position Fig. 8) when the clutch-shifter 16 is unlocked and the spring 33 acts upon the sleeve 24 to shift the rod 23 and therewith the arms 19 and 20 and the clutch-member to the left, the spring 33 acting in all respects the same as the spring $33^x$ only in an opposite direction.

From the foregoing it will be perceived that there has been provided a shifting mechanism which is extremely simple and sturdy in construction; which employs but a single trip for releasing the shifting mechanism; which positively locks the shiftable clutch-member in its different positions; and which will operate with equal facility whether the power being transmitted is great or small.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A clutch-shifting mechanism combining a non-translatable clutch-member; a shiftable clutch-member adapted to be engaged therewith; a clutch-shifter having a portion engaging said shiftable clutch-member, means including a single element movable in opposite direction for placing said clutch-shifter under oppositely directed spring pressure; an abutment member carried by said element and adapted to engage said clutch-shifter to hold it against movement in either direction until a predetermined pressure has been applied thereto, means for moving said abutment member to permit said clutch-shifter to move under said pressure to engage said clutch members; and means including said abutment-member for positively locking said clutch-shifter in its adjusted position.

2. A clutch-shifting mechanism combining a non-translatable clutch-member; a shiftable clutch-member adapted to be engaged therewith; a clutch-shifter having an arm engaging said shiftable clutch-member; another arm on said clutch-shifter projecting at an angle to said first-named arm; an abutment on said last named arm; a member movable toward and from said clutch-shifter; a spring operatively connecting said clutch-shifter and said movable member and adapted to be put under tension by the latter; an abutment on said movable member arranged normally to lie in the path of movement of said first-named abutment; means for effecting relative bodily movement between said abutments and simultaneously therewith applying tension to said spring; said movable member and spring acting successively to separate said abutments and immediately thereafter to shift said shiftable clutch-member.

3. A clutch-shifting mechanism combining a non-translatable clutch-member; a shiftable clutch-member adapted to be engaged therewith; a pivotally mounted clutch-shifter having a portion engaging said shiftable clutch-member; an abutment carried by said clutch-shifter; a bodily movable member adapted to place said clutch-shifter under spring pressure; an abutment carried by said bodily movable member and normally maintained in the path of said first-named abutment to prevent movement of said clutch-shifter until a predetermined pressure has been applied thereto; means for moving said bodily movable member in one direction to separate said abutments to permit said clutch-shifter to be actuated by said spring pressure; and means for returning the bodily movable member to its normal position to cause its abutment to again lock said clutch-shifter against movement.

4. A clutch-shifting mechanism combining a non-translatable clutch-element; a translatable clutch-member adapted to be moved into either of two positions; a clutch-shifter operatively connected with said translatable clutch-member and adapted to move it in opposite directions; a slide-bar connected with said clutch-shifter; a member slidingly mounted on said slide-bar; stops secured to said slide-bar at opposite sides of said member; springs interposed between said member and said stops; means to shift said member in opposite directions to apply oppositely directed spring pressure to said shifter; a single stop carried by said member and engaging said clutch-shifter in both of its positions and normally acting to prevent it from being shifted; and means rendering said stop ineffective, thereby permitting said clutch-shifter to shift said translatable clutch-member.

5. A clutch-shifting mechanism combining a translatable clutch-member; a clutch-shifter engaging said clutch-member; an abutment provided by said clutch-shifter; movable means for placing said clutch-shifter under tension; an abutment carried by said movable means and adapted to engage one portion of said first named abutment to temporarily prevent movement of the shifter; means for separating said abutments to permit said clutch-shifter to translate said translatable clutch-member; and means for bringing said abutments again into contact to prevent return of said clutch-shifter.

6. A clutch-shifting mechanism combining a translatable clutch-member; a clutch-shifter engaging said clutch-member; an abutment-block carried by said clutch-shifter and provided with two abutment faces; a spring operatively connected with said clutch-shifter; a movable member adapted to compress said spring and put said clutch-shifter under tension; an abutment-block carried by said movable member and provided with two abutment faces one of which is normally maintained in contact with one of the abutment faces of said clutch-shifter to hold the shifter against movement, and means for moving said movable member to compress said spring and then to separate said contacting abutment faces to permit said clutch-shifter to move under the action of said spring, said spring acting after the movement of said shifter to return said movable member to its normal position to contact the opposite faces of said abutments.

7. A clutch shifting mechanism combining a shiftable clutch-member provided with clutch-teeth at its opposite ends; a non-translatable clutch-member at each end of said shiftable clutch-member and provided with clutch-teeth adapted successively to be engaged with the teeth of said shiftable member; a clutch-shifter having a lost-motion connection with said shiftable clutch-member; an abutment-block carried by said clutch-shifter; a movable member; a spring located intermediate said movable member and said clutch shifter and adapted to be compressed by the former; an abutment on said movable-member normally maintained in contact with the abutment block on said clutch-shifter to hold the latter against movement; means for relatively shifting said abutments to separate them to permit said clutch-shifter to be moved by said spring, said abutments being so constructed and arranged that the movement required to separate them is greater than the entire movement of said clutch-shifter, whereby said spring is maintained under tension after said clutch-member is shifted and acts to return the movable member to its normal position.

8. A clutch-shifting mechanism combining two non-translatable clutch-members; a shiftable clutch-member intermediate the two clutch-members and adapted to be engaged with either; a clutch-shifter connected with said shiftable clutch-member; a rod parallel with the axis of said clutch-members; an operative connection between said rod and said clutch-shifter; an arm slidably mounted on said rod; collars fixed adjacent the opposite ends of said rod; a coil-spring located between said arm and each of said collars; means for moving said arm on said rod in either direction to compress one of said springs and place said clutch-shifter under pressure; a latch mechanism associated with said arm and said clutch-shifter and normally preventing movement of the latter and means for releasing said latch-mechanism by the movement of said arm.

9. A clutch shifting-mechanism combining a shiftable clutch-member; a pivoted clutch-shifter provided with an arm operatively connected with said shiftable clutch-member; a second arm on said clutch-shifter; an abutment carried by said second arm and movable in an arcuate path therewith; a clutch-shifter rod operatively connected with said clutch-shifter; a member slidable on said rod; collars fixed to said rod at opposite sides of said slidable member; springs surrounding said rod intermediate the slidable member and said collars; an abutment carried by said slidable member and normally engaging said first named abutment and holding said shifter against movement and means for moving said slidable member in either of two directions on said rod first to compress either of said springs and thereby place said rod and the clutch-shifter under spring pressure and then to separate said abutments to permit said rod and clutch-shifter to move under said pressure.

10. A clutch shifting mechanism combining a shiftable clutch-member; a clutch-shifter operatively connected therewith; two springs operatively connected with said clutch-shifter; a single movable element for compressing either of said springs to apply pressure to said clutch-shifter in opposite directions; a single latch-mechanism comprising coacting lugs carried by said movable element and clutch-shifter for normally preventing movement of said clutch-shifter in either of two directions; and means for shifting one of said lugs out of engagement with the other for releasing said latch after a predetermined pressure has been applied to either of said springs.

11. A clutch-shifting mechanism combining a shaft; two non-translatable clutch-members coaxial with said shaft; a clutch-member translatably mounted on said shaft and adapted to engage either of said two non-translatable members; a clutch-shifter engaging said translatable clutch-member and provided with an off-set arm; a rod arranged parallel with said shaft and operatively connected with said shifter; a member slidably mounted on said rod and provided with an offset arm adapted to engage the first named arm to prevent movement of said shifter; a spring surrounding said rod at each side of said member and held against bodily movement thereon; and means to translate said slidable member first to place one of said springs under tension and then to separate said arms to permit said shifter to move under the action of said spring.

12. A clutch-shifting mechanism of the load-and-fire type combining two non-translatable clutch-members; a shiftable clutch-member intermediate said two clutch-members and adapted to be selectively engaged therewith; a clutch-shifter; means for alternately applying spring-pressure to said clutch-shifter in opposite directions; a single detent means for temporarily preventing said clutch-shifter from being moved against either of said pressures; means for releasing said detent means; and a lost-motion connection between said clutch-shifter and said shiftable clutch-member whereby said clutch-shifter may be moved independently of said shiftable clutch-member.

13. A clutch-shifting mechanism combining a non-translatable clutch-member; a translatable clutch-member adapted to be engaged therewith; a movable clutch-shifter engaging said translatable clutch-member; a spring opposing the movement of said clutch-shifter in one direction; a movable member adapted to place said clutch-shifter under spring pressure, said clutch-shifter and movable member being so constructed and arranged that a portion of one normally lies in the path of the other to prevent movement of the clutch-shifter until a predetermined pressure has been applied thereto; means to move said movable member in one direction out of the path of said shifter to permit said shifter to be actuated by said spring pressure, and means to return said movable member to its normal position to cause it again to lock said clutch-shifter against movement.

In witness whereof, I hereunto subscribe my name.

PAUL C. BURTON.